United States Patent [19]
Kinoshita et al.

[11] Patent Number: 6,045,348
[45] Date of Patent: Apr. 4, 2000

[54] HOPPER STRUCTURE FOR FEEDING POWDERY MATERIALS

[75] Inventors: Kiyoshi Kinoshita; Toshihiko Kariya; Manabu Kawahara, all of Aichi-ken, Japan

[73] Assignee: Mitsubishi Heavy Industries, Ltd., Tokyo, Japan

[21] Appl. No.: 09/098,303

[22] Filed: Jun. 18, 1998

[30] Foreign Application Priority Data

Jun. 20, 1997 [JP] Japan .................................. 9-163723
Mar. 12, 1998 [JP] Japan .................................. 10-061593

[51] Int. Cl.⁷ .................................................. B29C 47/10
[52] U.S. Cl. ........................................ 425/203; 366/76.1
[58] Field of Search ............................ 425/203; 366/75, 366/76.1, 76.9, 76.91, 76.92

[56] References Cited

U.S. PATENT DOCUMENTS 4,112,519  9/1978  Kruder ..................................... 425/203
4,636,084  1/1987  Kopernicky ........................... 366/76.1

FOREIGN PATENT DOCUMENTS 14 54 869   3/1969   Germany .
43 41 640  12/1994   Germany .
62-24247    5/1987   Japan .
2-34009     9/1990   Japan .
2-127416   10/1990   Japan .

*Primary Examiner*—Tim Heitbrink
*Attorney, Agent, or Firm*—Armstrong, Westerman, Hattori, McLeland & Naughton

[57] ABSTRACT

The present invention is directed to a hopper structure for feeding a powdery material adapted to enable gas, etc., generated in a plasticizing cylinder to escape irrespective of the state of feed of the powdery material within a hopper. To this end, the hopper structure of the present invention is arranged such that the plasticizing cylinder is formed with a material feed port for providing a communication between the interior and the exterior of the plasticizing cylinder, and that a hopper is provided for feeding a powdery material via the material feed port to the outer periphery of a screw within the plasticizing cylinder, and that a material feeding tube is mounted to the bottom of the hopper for allowing a communication between the bottom of the hopper and the vicinity of the outer periphery of the screw, with a gap for the removal of air being formed between the outer peripheral surface of the material feeding tube and the inner peripheral surface of the material feed port, the gap extending from the vicinity of the outer periphery of the screw to the exterior. The present invention is applied for the feed of a powdery molding material into the plasticizing cylinder of an in-line screw injection molding machine or of an in-line screw extrusion molding machine.

5 Claims, 7 Drawing Sheets

HOPPER STRUCTURE FOR FEEDING POWDERY MATERIALS

BACKGROUND OF THE INVENTION

1) Field of the Invention

The present invention relates to a powdery material feeding hopper structure for feeding powdery molding materials into a plasticizing cylinder of an in-line screw injection molding machine or an in-line screw extrusion molding machine (hereinafter, referred to simply as a molding machine).

2) Description of the Related Art

FIG. 7 is a longitudinal sectional view illustrating a plasticizing cylinder of an injection molding machine having a conventional material feeding hopper structure. As shown in FIG. 7, the plasticizing cylinder 3 is in the form of a heating cylinder having a heater not shown mounted on the outer periphery thereof. The plasticizing cylinder 3 includes therein a plasticizing screw 6 which is supported rotatably and slidably longitudinally (in the axial direction, i.e., in the right to left direction of FIG. 7). The tip (a front end) of the plasticizing cylinder 3 is provided with a nozzle 3a for injecting a plasticized molten resin material into a metal mold not shown.

The plasticizing cylinder 3 has at its upper portion to the base end (the right upper portion of FIG. 7) a circular material feed port 4 allowing a communication between the interior and the exterior of the plasticizing cylinder 3, with the material feed port 4 being surrounded by an upward projecting hopper mounting portion 21. A hopper 2 is mounted to a hopper mounting portion 21 to feed a molding resin material 1 through the material feed port 4 to the outer periphery close to the base end of the plasticizing screw 6 within the plasticizing cylinder 3.

The hopper 2 is mounted to the hopper mounting portion 21 by fastening a flange 2a formed on its lower outer periphery against the top surface of the hopper mounting portion 21 with bolts (not shown) or other fastening means.

The plasticizing screw 6 has flights 6a formed around its outer periphery for delivering the material 1 forward (leftward in FIG. 7). The plasticizing screw 6 is rotated on its base end side by a motor not shown to deliver the material 1 from the hopper 2 forward while plasticizing the same. Furthermore, the plasticizing screw 6 is displaced forward relative to the plasticizing cylinder 3 by an injection cylinder not shown.

Due to the above construction, the material 1 introduced into the hopper 2 is fed through the material feed port 4 to the outer periphery on the base end side of the plasticizing screw 6 within the plasticizing cylinder 3, and then is delivered forward (toward the tip of the screw) along the grooves defined between the flights 6a of the screw 6 in the cylinder 3 while being gradually melted by a heat from the cylinder 3 and from a share heat caused by the rotation of the screw 6.

Once it is measured that a predetermined amount of molten resin (material 1) has been fed into a space on the tip side of the screw 6, the rotation of the screw 6 is brought to a stop and the screw 6 is displaced forward relative to the cylinder 3 by the injection cylinder not shown, allowing the molten resin within the cylinder 3 to be ejected through the nozzle 3a into the metal mold not shown. When the molten resin in the metal mold is cooled, a molded part in the mold is removed to complete a series of molding cycle steps.

By the way, in case of using the material 1 in the form of a powder, air contained in the powdery material 1 is compressed to increase its pressure when the powdery material 1 is delivered toward the tip of the screw 6 while being plasticized and melted together with the rotation of the screw 6 during the above molding cycle, which may possibly cause the material 1 to flow backward toward the base end (the rear side) of the screw 6 or toward the hopper 2.

At that time, if a volume of material 1 lies within the hopper 2, the resistance against the backward flow of air at the material feed port 4 increases with the result that air and the powdery material 1 may pass through a gap 11 defined between the screw 6 and the heating cylinder 3 and having a smaller resistance than at the material feed port 4 and then spout backward of the cylinder 3, allowing the material 1A to escape to the exterior.

Thus, as shown in FIG. 9 for example, in order to prevent the air and the powdery material 1 from flowing backward of the screw 6 and from passing through the gap 11 for spouting, a technique is proposed which employs a packing 13 mounted on the inner peripheral surface on the rear end side of the cylinder 3 to thereby close the gap 11 while being in contact with the outer peripheral surface of the screw 6, with a packing gland 14 serving to prevent the packing 13 from coming off. However, this technique suffers from a drawback that the packing gland 14 becomes worn earlier due to its contact with the screw 6, allowing an immediate escape of the powdery material 1.

In another technique (see Japanese Utility Model Pub. No. HEI2-34009) shown in FIG. 10 for example, an inner hopper 7 is provided on the inside of the hopper 2 by means of an engagement protrusion 9, to define a gap 18 extending from the bottom of the hopper 2 to the top thereof between the inner hopper 7 and the outer hopper 2. By virtue of such a hopper structure, as indicated by an arrow a' in FIG. 10, gas or the like within the cylinder 3 passes through the gap 18 to the exterior so that there is eliminated a variation in pressure caused by the material 1 lying in the bottom of the hopper 2, thereby making it possible to keep the feed pressure applied to the screw 6 at a certain level and to achieve a stable plasticization.

However, even in case of such a hopper structure as shown in FIG. 10, the material feed port 4 is actually at all times filled with the material 1 as shown in FIG. 10 and the hopper 2 is also loaded with the material 1, so that it is difficult to cause the backward flow of air or the like as described above to easily escape into the gap 18, eventually allowing the material to pass through the gap between the cylinder 3 and the screw 6 to spout from the rear end side.

SUMMARY OF THE INVENTION

The present invention was conceived in view of the above problems. It is therefore the object of the present invention to provide a powdery material feeding hopper structure adapted to enable gas, etc., generated in a plasticizing cylinder to escape to the exterior irrespective of the state of feed (the degree of filling) of the powdery material within a hopper, thereby securely preventing the powdery material from spouting or leaking out to the exterior.

In order to achieve the above object, a powdery material feeding hopper structure of the present invention is connected to a plasticizing cylinder of an in-line screw injection molding machine or an extrusion molding machine to feed a powdery in-line screw material to be molded into the plasticizing cylinder, the structure comprising a material feed port formed in the plasticizing cylinder to provide a communication between the interior and the exterior of the plasticizing cylinder; a hopper for feeding the powdery material via the material feed port to the outer periphery of a screw within the plasticizing cylinder; and a material feeding tube mounted to the bottom of the hopper to provided a communication between the bottom of the hopper and the vicinity of the outer periphery of the screw; with a deaerating gap formed between the outer peripheral surface of the material feeding tube and the inner peripheral surface of the material feed port, the gap extending from the vicinity of the outer periphery of the screw to the exterior.

A cover portion may be formed on the material feeding tube to cover an opening through which the deaerating gap leads to the exterior without interrupting an outflow of an air removed from the interior of the plasticizing cylinder. The material feed port may be formed so as to have a sectional shape corresponding to the sectional shape of the material feeding tube.

In case the plasticizing cylinder is fitted into a cylinder housing, the lower end opening of the material feeding tube confronting the outer periphery of the screw maybe positioned on the outside of a fitting portion of the cylinder housing, into which the plasticizing cylinder is fitted.

According to the powdery material feeding hopper structure of the present invention in this manner, there is provided an extremely simple construction including the material feeding tube for allowing the bottom of the hopper to communicate with the vicinity of the outer periphery of the screw and including the deaerating gap extending from the vicinity of the outer periphery of the screw to the exterior between the outer peripheral surface of the material feeding tube and the inner peripheral surface of the material feed port, whereby the powdery material within the hopper is fed substantially directly to the vicinity of the outer periphery of the screw within the plasticizing cylinder and whereby even though the material has entered into the interior of deaerating gap as a result of backward flow of air, etc., the material falls spontaneously and is again fed to the plasticizing cylinder, thus keeping at all times the interior of the deaerating gap substantially vacant of the powdery material.

It is thus possible to release gas, etc., generated in the plasticizing cylinder to the exterior irrespective of the state of feed (the degree of filling) of the powdery material within the hopper, thereby achieving a secure prevention of the spout or leak of the powdery material to the exterior.

Furthermore, the cover portion formed on the material feeding tube serves to cover the opening through which the deaerating gap leads to the exterior without interrupting the outflow of air removed from the interior of the plasticizing cylinder, so that it is possible to securely prevent foreign matters, etc., from entering the plasticizing cylinder from the exterior through the deaerating gap.

Moreover, in case the plasticizing cylinder is fitted into the cylinder housing, the lower end opening of the material feeding tube confronting the outer periphery of the screen is positioned on the outside of the fitting portion of the cylinder housing into which the plasticizing cylinder is fitted, so that the plasticizing cylinder and the material feeding tube are not allowed to interfere with each other even when the plasticizing cylinder is detached from the cylinder housing with the material feeding tube mounted, thereby eliminating any fear of a damage to the material feeding tube. Thus, upon the attachment or detachment of the plasticizing cylinder, there is no need to disassemble or reassemble the hopper structure, which would otherwise require excess labor hours or costs.

DESCRIPTION OF THE PREFERRED EMBODIMENTS

Embodiments of the present invention will now be described with reference to the accompanying drawings.

Figure 1:
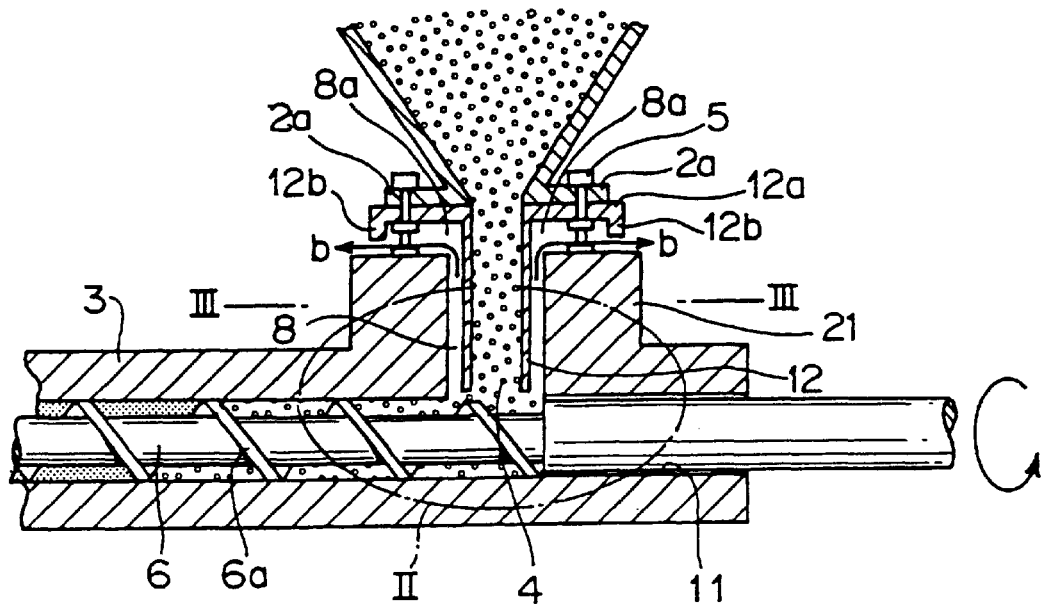
FIG. 1 is a longitudinal sectional view illustrating a hopper structure for feeding a powdery material in accordance with an embodiment of the present invention.
Figure 2:
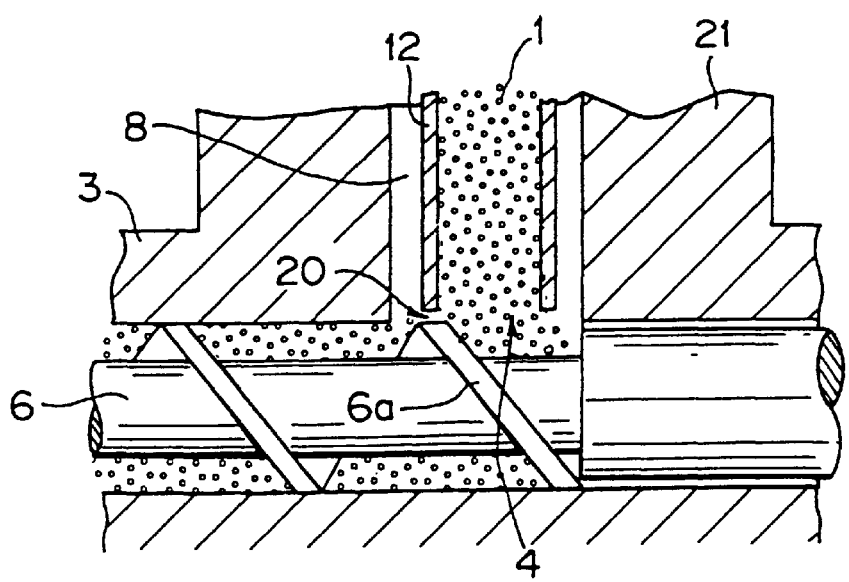
FIG. 2 is a longitudinal sectional view illustrating a portion II of FIG. 1 in an enlarged manner.
Figure 3:
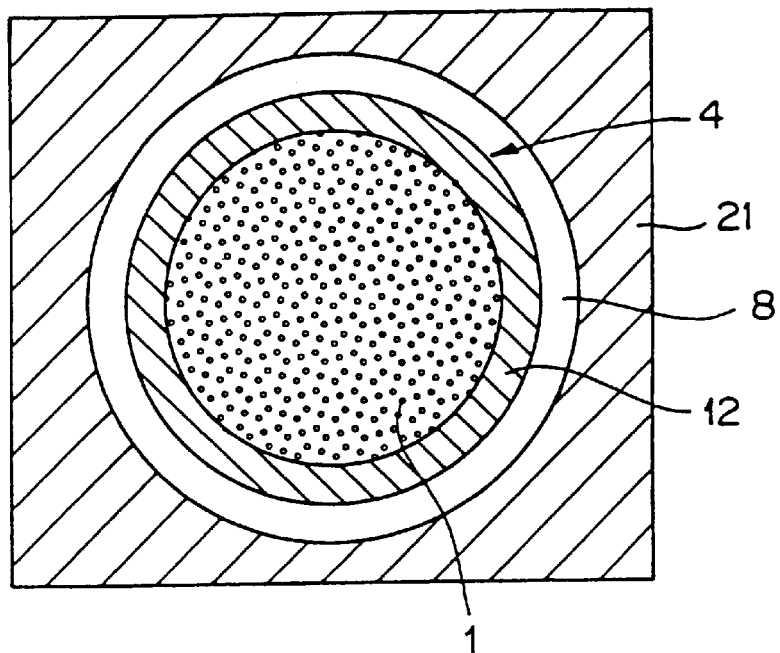
FIG. 3 is a sectional view taken along a line III—III of FIG. 1.

FIGS. 1 to 3 illustrate a hopper structure for feeding powdery materials in accordance with an embodiment of the present invention. FIG. 1 is a longitudinal sectional view thereof, FIG. 2 is a longitudinal sectional view showing a portion II of FIG. 1 in an enlarged manner, and FIG. 3 is a sectional view taken along a line III—III of FIG. 1. In this embodiment as well, description is made of a case where the hopper structure is applied to the plasticizing cylinder (heating cylinder) 3 of the in-line screw injection molding machine as shown in FIG. 1 in the same manner as the conventional one. In the diagrams, reference numerals identical to the above numerals designate the same or substantially the same parts, and hence the detailed description thereof will be omitted.

As shown in FIG. 1 to 3, the plasticizing cylinder 3 has a circular material feed port 4 formed at its upper portion close to the base end, for allowing a communication between the interior and the exterior of the plasticizing cylinder 3, the material feed port 4 being surrounded by an upward projecting hopper mounting portion 21.

This embodiment is provided with a hopper 2 for feeding a powdery resin material 1 via the material feed port 4 to the outer periphery (grooves defined between flights 6a) of a screw 6 within the plasticizing cylinder 3 and with a material feeding tube 12 for providing a communication between the bottom of the hopper 2 and the vicinity of the outer periphery of the screw 6.

The material feeding tube 12 has a flange 12a formed at the upper portion thereof, and mounting members 5 extend through the flange 12a and a flange 2a of the hopper 2 abutting against the flange 12 to integrally fixedly mount the hopper 2 and the material feeding tube 12 to the hopper mounting portion 21.

At that time, the material feeding tube 12 is mounted by the mounting members 5 in such a manner that a gap for the removal of air or gas (a deaeration gap) 8a is formed between the flange 12a of the material feeding tube 12 and the top surface of the hopper mounting portion 21.

In this embodiment, as shown in FIG. 3, the material feed port 4 is of a circular section corresponding to the sectional shape of the material feeding tube 12 and has an internal diameter slightly larger than the external diameter of the tube 12. Thus, by inserting the circular material feeding tube 12 into the interior of the material feed port 4, there is formed a gap 8 for the removal of air or gas (a deaeration gap) as indicated by arrows b in FIG. 1 between the outer peripheral surface of the material feeding tube 12 and the inner peripheral surface of the material feed port 4, the gap 8 having an interval of about 5 m and extending from the vicinity of the outer periphery of the screw 6 to the exterior (the gap 8a).

Incidentally, the inner and outer surfaces of the material feeding tube 12 are surface treated with e.g., stainless steel (SUS304) or chrome plating or nickel plating having anti-corrosive properties.

As shown in FIG. 2, a gap 20 of about 2 mm is formed between the bottom end of the material feeding tube 12 and the top of the flights 6a of the screw 6.

Furthermore, the circumferential portion of the flange 12a of the material feeding tube 12 is provided with a downward extending bent (cover portion) 12b so as to partially cover an opening (a portion at which the bottom surface of the flange 12a and the top surface of the hopper mounting portion 21 are opened to the exterior) through which the gaps 8 and 8a lead to the exterior, without interrupting a flow of air removed from the interior of the plasticizing cylinder 3.

Description will then be made of an operation of the thus constructed hopper structure for feeding powdery materials in accordance with an embodiment of the present invention.

The powdery material 1 loaded into the hopper 2 is fed substantially directly to the vicinity of the outer periphery of the screw 6 (the vicinity of the grooves defined between the flights 6a) within the plasticizing cylinder 3 through the material feeding tube 12. The screw 6 is then rotated by a drive system not shown so that the powdery material 1 containing a volume of air is fed forward (toward the tip of the screw) along the grooves between the flights 6a of the screw 6 within the interior of the plasticizing cylinder 3.

The screw 6 is structured in such a manner that the volume of the grooves between the flights 6a is reduced downstream so that the powdery material 1 is gradually compressed into molten state. In such a compression step, air contained in the material 1 (among particles of the powdery material 1) flows upstream (toward the base end side, i.e., right side of FIGS. 1 and 2) together with part of the material 1.

In this embodiment, the air flowing backward as described above is ejected into the gap 8 (the area having a less air flow resistance) for the removal of air or gas formed between the plasticizing cylinder 3 and the material feeding tube 12. For this reason, the air and material 1 flowing backward can not reach the gap 11 defined between the plasticizing cylinder 3 and the screw 6, with the result that it is possible to securely prevent the powdery material 1 from spouting or leaking out of the rear end side of the plasticizing cylinder 3.

The powdery material 1 ejected into the gap 8 for the removal of air or gas is not allowed to reach the exterior as long as the gap 8 has an appropriate length, so that only the air flows to the exterior as indicated by the arrows b in FIG. 1. Then, the material 1 within the gap 8 falls spontaneously to return to the interior of the plasticizing cylinder 3 and then is delivered toward the front of the plasticizing cylinder 3 with the rotating action of the screw 6 in the next molding cycle, so that the interior of the gap 8 is kept vacant of the powdery material 1, minimizing the backflow air resistance at the region of the gap 8 to thereby securely eliminate the material leak to the rear end of the plasticizing cylinder 3.

Furthermore, in this embodiment, the bend 12b formed on the circumferential portion of the flange 12a of the material feeding tube 12 partially covers the opened portion (the opening) through which the gaps 8 and 8a lead to the exterior without interrupting the outflow of air removed from the interior of the plasticizing cylinder 3, so that it is possible to securely prevent foreign matters, etc., from entering the plasticizing cylinder 3 from the exterior through the gaps 8a and 8.

In this manner, according to the hopper structure for feeding a powdery material in accordance with an embodiment of the present invention, the interior of the gap 8 is at all times kept vacant of or substantially vacant of the powdery material 1 so that air, etc., from the interior of the plasticizing cylinder 3 can easily escape to the exterior irrespective of the state of feed (the degree of filling) of the powdery material 1 within the hopper 2, thereby making it possible to securely prevent the powdery material 1 from spouting or leaking from the rear end to the exterior.

Although in the above embodiment, description has been made of the case where both the material feed port 4 and the material feeding tube 12 have circular sections as shown in FIG. 3, the present invention is not intended to be limited to this.

Figure 4:
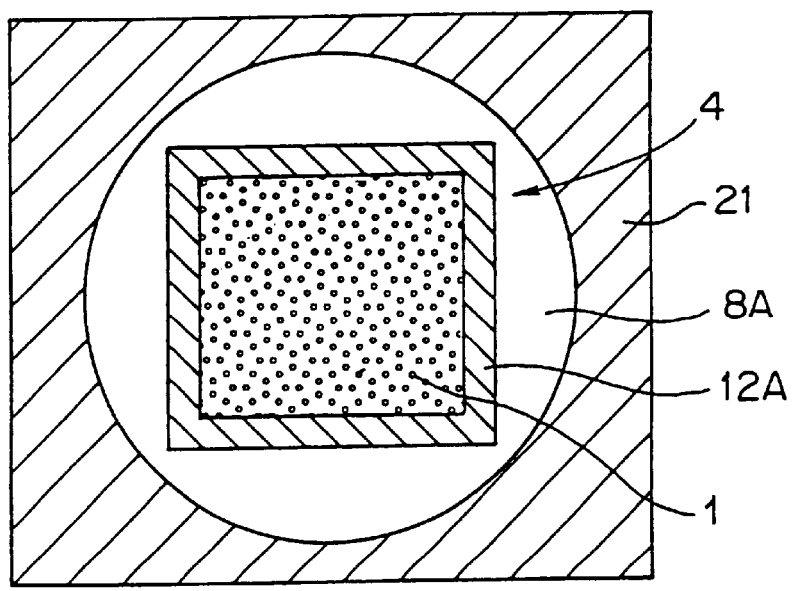
FIG. 4 is a sectional view (a section taken at a position corresponding to a line III—III of FIG. 1) illustrating a first variant of the geometry of a gap for the removal of air or gas in this embodiment.
Figure 5:
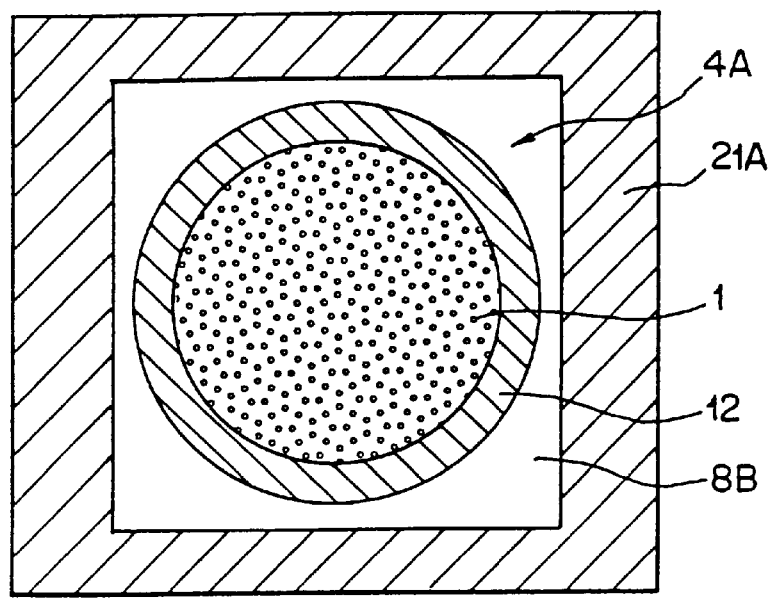
FIG. 5 is a sectional view (a section taken at a position corresponding to a line III—III of FIG. 1) illustrating a second variant of the geometry of a gap for the removal of air or gas in this embodiment.
Figure 6:
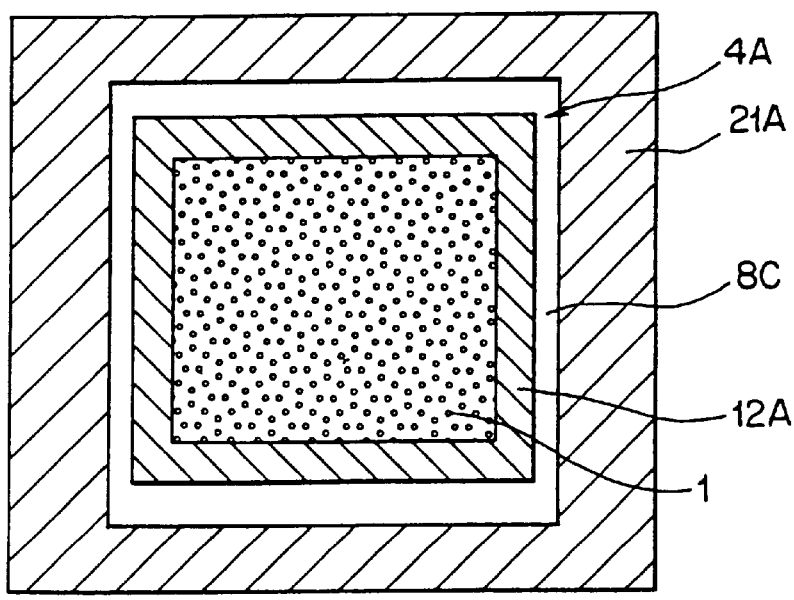
FIG. 6 is a sectional view (a section taken at a position corresponding to a line III—III of FIG. 1) illustrating a third variant of the geometry of a gap for the removal of air or gas in this embodiment.
Figure 7:
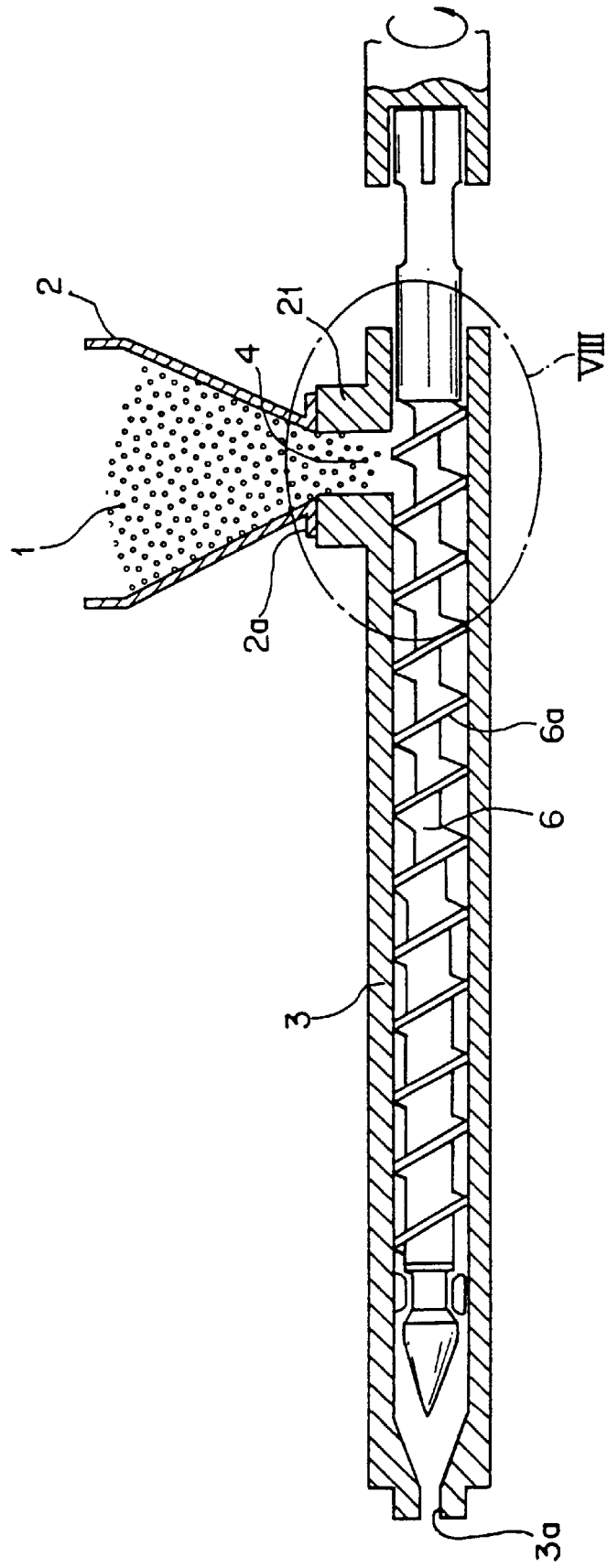
FIG. 7 is a longitudinal sectional view illustrating a plasticizing cylinder of an injection molding machine having a conventional material feeding hopper structure.
Figure 8:
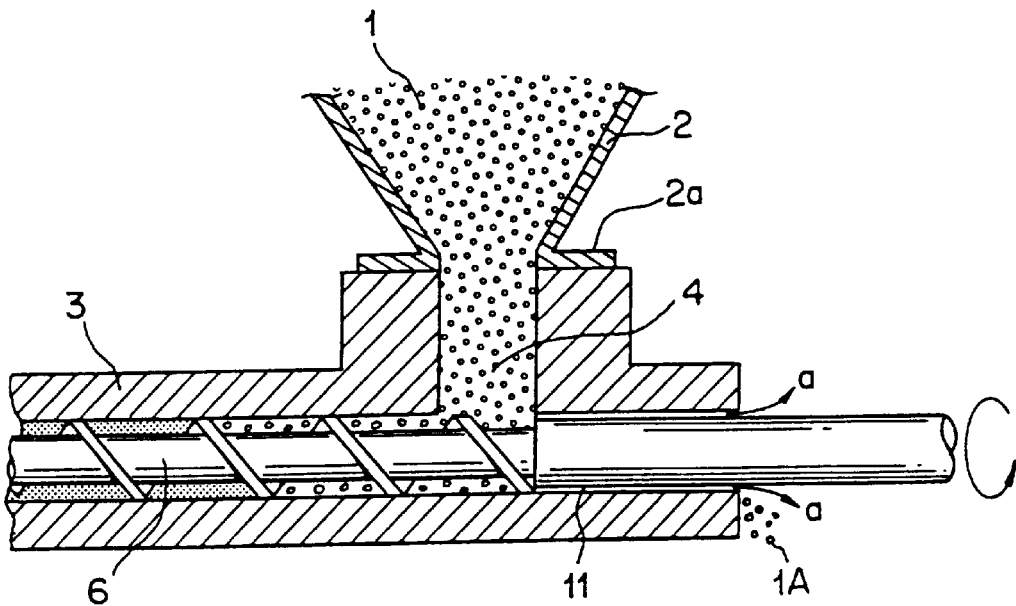
FIG. 8 is a longitudinal sectional view illustrating a portion VIII of FIG. 7 in an enlarged manner.
Figure 9:
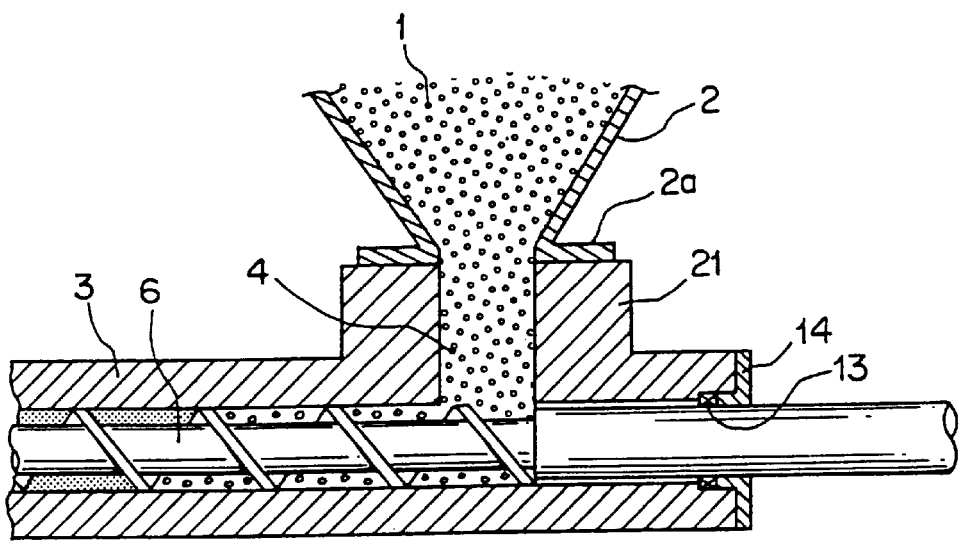
FIG. 9 is a longitudinal sectional view (a longitudinal section taken at a position corresponding to the portion VIII of FIG. 7) showing the principal part of another plasticizing cylinder of the injection molding machine having a conventional material feeding hopper structure.
Figure 10:
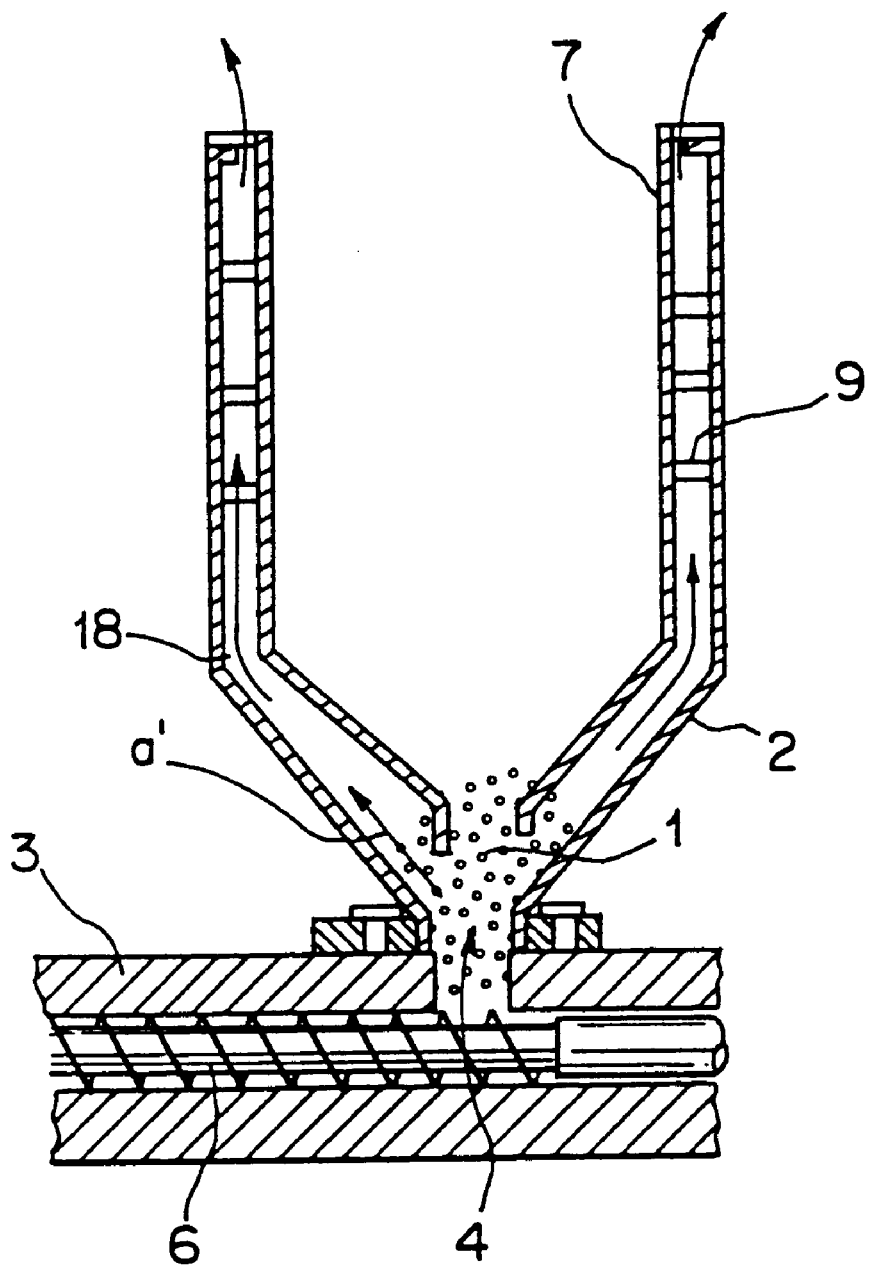
FIG. 10 is a longitudinal sectional view showing a further conventional material feeding hopper structure.

For example, as shown in FIG. 4, a material feeding tube 12A having a rectangular section may be inserted into the circular material feed port 4 to form a gap (a deaeration gap) 8A for the removal of air or gas. Alternatively, as shown in FIG. 5, the material feeding tube 12 having a circular section may be inserted into a rectangular material feed port 4A to form a gap (a deaeration gap) 8B for the removal of air or gas. Otherwise, as shown in FIG. 6, the material feeding tube 12A having a rectangular section may be inserted into the rectangular feed port 4A to form a gap (a deaeration gap) 8C for the removal of air or gas. In any case, the same function and effect as the above embodiment could be achieved. In FIGS. 5 and 6, reference numeral 21A denotes a hopper mounting portion having the rectangular material feed port 4A.

Figure 11:
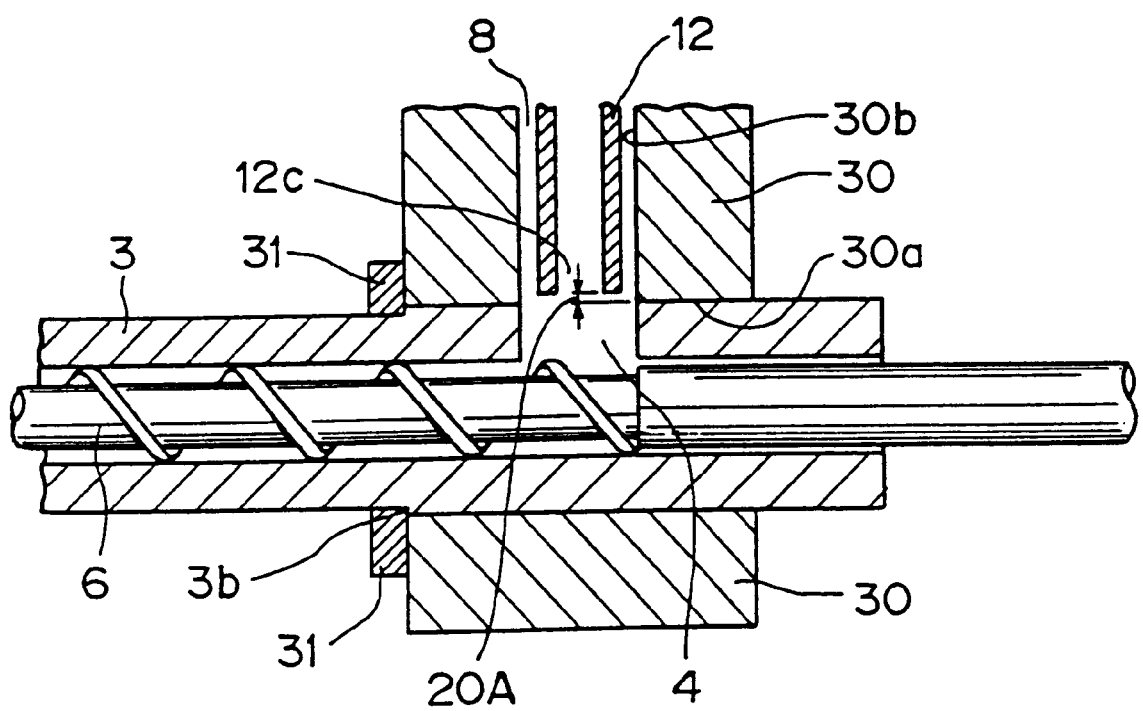
FIG. 11 is a longitudinal sectional view showing the principal part of a variant of the powdery material feeding hopper structure in accordance with an embodiment of the present invention.

Incidentally, the plasticizing cylinder 3 is typically elongated and heavy. For this reason, in order to prevent the mounting portion of the plasticizing cylinder 3 from being subjected to a large bending moment, a cylinder housing 30 is ordinarily manufactured separately from the plasticizing cylinder 3 as shown in FIG. 11. The plasticizing cylinder 3 is fitted into a fitting hole (a fitting portion) 30a of the cylinder housing 30 integral with the base not shown. Such an assembling structure is naturally required not only for the prevention of the occurrence of the bending moment but also for the replacement of the plasticizing cylinder 3 which has been worn out.

Illustrated in FIG. 11 is an example of the hopper structure for feeding a powdery material to be applied to the above structure. In this case, the plasticizing cylinder 3 is fixedly secured to the cylinder housing 30 by fastening a cylinder mounting flange 31 abutting against peripheral steps 3b of the plasticizing cylinder 3 to the cylinder housing 30 with bolts not shown.

In cases where the plasticizing cylinder 3 is removably mounted to the cylinder housing 30 and where the lower end of the material feeding tube 12 extends up to the vicinity of the periphery of the screw 6 as shown in FIGS. 1 and 2, an attempt to detach the plasticizing cylinder 3 from the cylinder housing 30 with the material feeding tube 12 mounted thereto will lead to a mutual interference of the plasticizing cylinder 3 and the material feeding tube 12, which may possibly cause a damage to the material feeding tube 12. Thus, the hopper structure must be disassembled in case of mounting or demounting the plasticizing cylinder 3.

Thus, in case the plasticizing cylinder 3 is fitted rigidly into the fitting hole 30a of the cylinder housing 30, an lower end opening 12c of the material feeding tube 12 confronting the outer periphery of the screw 6 is positioned on the outside of the fitting hole 30a of the housing cylinder 30, into which the plasticizing cylinder 3 is fitted as shown in FIG. 11.

In the example shown in FIG. 11, the lower end opening 12c of the material feeding tube 12 is positioned outwardly apart an interval 20A from the inner peripheral surface of the fitting hole 30a (the outer peripheral surface of the plasticizing cylinder 3). More precisely, the lower end opening 12c of the material feeding tube 12 is disposed at a position apart from the external diameter of the screw 6 by a distance equal to the sum of the thickness of the plasticizing cylinder 3 and the interval 20A.

In this case, the cylinder housing 30 is also provided with a material feed port 30b opening into the material feed port 4 of the plasticizing cylinder 3 for providing a communication between the interior and the exterior of the plasticizing cylinder 3. When the material feeding tube 12 is inserted into the material feed port 30b, a gap (a deaeration gap) 8 for the removal of air or gas extending from the vicinity of the outer periphery of the screw 6 to the exterior is formed between the outer peripheral surface of the material feeding tube 12 and the inner peripheral surface of the material feed port 30b.

Furthermore, in the structure shown in FIG. 11, the cylinder housing 30 serves as the hopper mounting portion 21 or 21A described above.

It is to be appreciated that results of experiments prove that the lower end opening 12c of the material feeding tube 12 may be positioned outwardly apart a distance larger than the thickness of the plasticizing cylinder 3 from the external diameter of the screw 6 to achieve the same function as the above embodiment described with reference to FIGS. 1 to 6.

According to the hopper structure shown in FIG. 11, even though the plasticizing cylinder 3 is detached from the cylinder housing 30 with the material feeding tube 12 mounted thereto, the plasticizing cylinder 3 is not allowed to interfere with the material feeding tube 12, thereby eliminating any fear of damaging the material feeding tube 12. Thus, upon the mounting or demounting of the plasticizing cylinder 3, there is no need to disassemble or reassemble the hopper structure, which would otherwise require excess labor hours and costs.

Although in the above embodiment, description has been made of the case where the present invention is applied to the plasticizing cylinder of the injection molding machine, the present invention is not limited to this but is applicable to the plasticizing cylinder of an extrusion molding machine as well to ensure the same function and effect as the above embodiments.

Thus, the present invention is not intended to be limited to the above embodiments and could be variously modified without departing from the present invention and the spirit thereof.

What is claimed is:

1. A powdery material feeding hopper structure, for an in-line screw injection or extrusion molding machine having a plasticizing cylinder fitted in a cylinder housing connected to a plasticizing cylinder, for feeding a powdery material to be molded into said plasticizing cylinder, said structure comprising:

a material feed port, disposed in said plasticizing cylinder, for providing a communication between the interior and the exterior of said plasticizing cylinder;

a hopper, disposed upstream of said material feed port, for feeding said powdery material via said material feed port to the outer periphery of a screw within said plasticizing cylinder; and a material feeding tube projecting from the bottom of said hopper for providing a communication between the bottom of said hopper and the vicinity of the outer periphery of said screw;

said material feeding tube having an outer peripheral surface radially spaced from the inner peripheral surface of said material feed port by a gap extending from the vicinity of the outer periphery of said screw to open air for allowing gas in said plasticizing cylinder to escape, the lower end opening of said material feeding tube confronting the outer periphery of said screw being positioned on the outside of a fitting portion of said cylinder housing.

2. A powdery material feeding hopper structure according to claim 1, further comprising a cover portion formed on said material feeding tube, for covering an opening through which said deaerating gap leads to open air, without interrupting an outflow of an air removed from the interior of said plasticizing cylinder.

3. A powdery material feeding hopper structure according to claim 2, wherein said material feed port is formed so as to have a sectional shape corresponding to the sectional shape of said material feeding tube.

4. A powdery material feeding hopper structure according to claim 2, wherein when said plasticizing cylinder is fitted into a cylinder housing, the lower end opening of said material feeding tube confronting the outer periphery of said screw is positioned on the outside of a fitting port ion of said cylinder housing, into which said plasticizing cylinder is fitted.

5. A powdery material feeding hopper structure according to claim 3, wherein when said plasticizing cylinder is fitted into a cylinder housing, the lower end opening of said material feeding tube confronting the outer periphery of said screw is positioned on the outside of a fitting portion of said cylinder housing, into which said plasticizing cylinder is fitted.

* * * * *